(12) United States Patent
Young et al.

(10) Patent No.: US 8,504,939 B2
(45) Date of Patent: Aug. 6, 2013

(54) VERTICAL CLICK AND DRAG TO DRILL DOWN INTO METADATA ON USER INTERFACE FOR AUDIO VIDEO DISPLAY DEVICE SUCH AS TV

(75) Inventors: David Young, San Diego, CA (US); Steven Friedlander, San Diego, CA (US); Sabrina Tai-Chen Yeh, Laguna Beach, CA (US)

(73) Assignee: Sony Corporation, Tokyo (JP)

( * ) Notice: Subject to any disclaimer, the term of this patent is extended or adjusted under 35 U.S.C. 154(b) by 151 days.

(21) Appl. No.: 13/163,923

(22) Filed: Jun. 20, 2011

(65) Prior Publication Data
US 2012/0260212 A1   Oct. 11, 2012

Related U.S. Application Data

(60) Provisional application No. 61/473,098, filed on Apr. 7, 2011.

(51) Int. Cl.
*G06F 3/048* (2006.01)
(52) U.S. Cl.
USPC .............................. 715/784; 345/172; 725/43

(58) Field of Classification Search
USPC ................ 725/40, 43; 715/808, 784; 345/172
See application file for complete search history.

(56) References Cited

U.S. PATENT DOCUMENTS

| | | | | |
|---|---|---|---|---|
| 6,151,059 | A  * | 11/2000 | Schein et al. | 725/37 |
| 6,857,128 | B1 * | 2/2005 | Borden et al. | 715/784 |
| 8,291,349 | B1 * | 10/2012 | Park et al. | 715/863 |
| 2003/0014752 | A1 * | 1/2003 | Zaslavsky et al. | 725/40 |
| 2003/0184578 | A1 * | 10/2003 | Cowperthwaite | 345/721 |
| 2006/0020969 | A1 * | 1/2006 | Utsuki et al. | 725/39 |
| 2006/0041926 | A1 * | 2/2006 | Istvan et al. | 725/133 |
| 2008/0162430 | A1 * | 7/2008 | Gossweiler et al. | 707/3 |
| 2009/0198359 | A1 * | 8/2009 | Chaudhri | 700/94 |
| 2009/0217210 | A1 * | 8/2009 | Zheng et al. | 715/863 |
| 2010/0001960 | A1 * | 1/2010 | Williams | 345/173 |
| 2011/0018802 | A1 * | 1/2011 | Sung et al. | 345/158 |
| 2012/0284753 | A1 * | 11/2012 | Roberts et al. | 725/45 |

* cited by examiner

*Primary Examiner* — Doon Chow
*Assistant Examiner* — Andrew T Chiusano
(74) *Attorney, Agent, or Firm* — John L. Rogitz; John M. Rogitz

(57) ABSTRACT

An initial vertical drag command input to a GUI of a display having a grid of content information panels causes metadata related to one of the content information panels to be displayed, typically overlaid on an information panel adjacent the selected panel. A subsequent vertical drag command causes enhanced metadata to be displayed in a larger window.

14 Claims, 3 Drawing Sheets

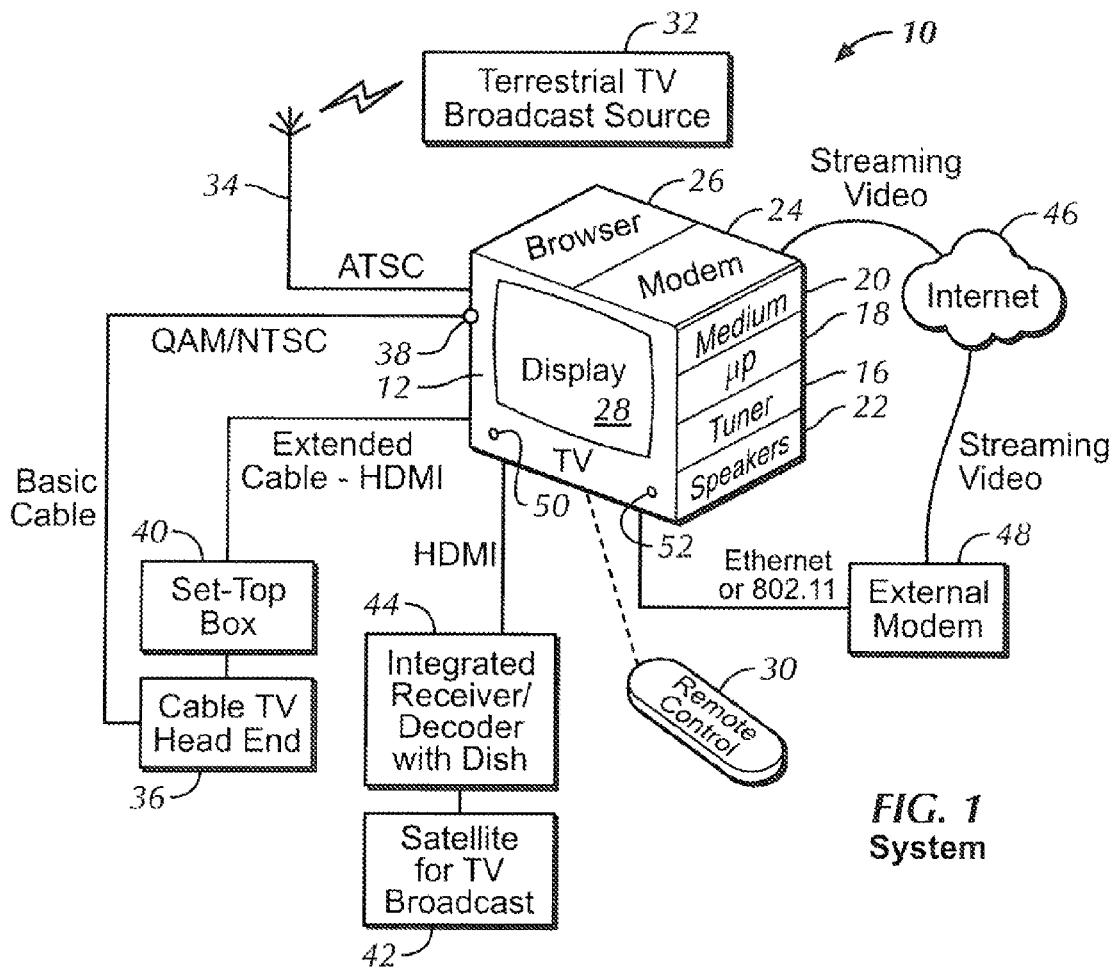
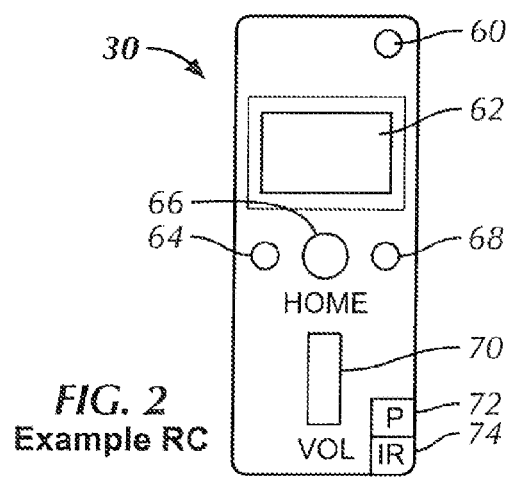
FIG. 1
System
FIG. 2
Example RC

GUI (coarse)

GUI (fine)

VERTICAL CLICK AND DRAG TO DRILL DOWN INTO METADATA ON USER INTERFACE FOR AUDIO VIDEO DISPLAY DEVICE SUCH AS TV

This application claims priority to U.S. provisional patent application Ser. No. 61/473,098, filed Apr. 7, 2011.

FIELD OF THE INVENTION

The present application relates generally to user interfaces (UI) for audio video display devices (AVDD) such as televisions (TVs).

BACKGROUND OF THE INVENTION

User interfaces for AVDDs often require a viewer to navigate through a cumbersome system of menus to establish AVDD settings and to gain information pertaining to a particular program. As understood herein, these types of solutions fail to offer a viewer a way to quickly and easily obtain information about a program with minimal user interface steps, nor are they intuitive to many viewers.

SUMMARY OF THE INVENTION

According to principles set forth further below, an audio video display device (AVDD) includes a processor, a video display, and computer readable storage medium bearing instructions executable by the processor to present on the display a grid of information panels. Each information panel presents visual information pertaining to respective audio video programs. The AVDD receives a vertical drag command, determines the information panel to which the vertical drag command pertains, and responsive to the vertical drag command and determination of which information panel the drag command pertains, presents on the display metadata related to the information panel to which the vertical drag command pertains.

In some embodiments the metadata is presented in a window superimposed on an information panel in a grid position below the information panel to which the vertical drag command pertains. If desired, the vertical drag command can be considered to be a first vertical drag command and the metadata is a relatively small metadata view. Responsive to a second vertical drag command being received on the relatively small metadata view, the AVDD may present on the display a relatively large metadata view containing metadata related to the information panel to which the first vertical drag command pertains. Or, the second vertical drag command can be interpreted as such by virtue of being received within a predetermined time period of receiving the first vertical drag command.

According to present principles the vertical drag command may be received from a touch pad of a remote control communicating wirelessly with the processor. Or, the vertical drag command can be received from a camera imaging a human gesture in free space and communicating with the processor. Yet again, the vertical drag command may be received from a microphone detecting a verbal drag command and communicating with the processor.

In another aspect, an audio video display device (AVDD) includes a processor, a video display, and computer readable storage medium bearing instructions executable by the processor to present a graphical user interface (GUI) on the display. The GUI includes plural content information panels each selectable to cause the processor to present on the display respective audio video content. A first command is received pertaining to the GUI to access metadata related to an audio video program represented by a first one of the content information panels. Responsive to the first command, a screen shot appears on the display to show condensed metadata related to a respective first audio video program represented by the first content information panel. The condensed metadata is presented in a window that is substantially the same size and shape as an information panel and that is overlaid thereon. A second command is received pertaining to the screen shot to access additional metadata and responsive to the second command, a screen shot appears on the display to show enhanced metadata related to the first audio video program. The enhanced metadata is presented in a second window larger than the first window.

In another aspect, a method includes presenting on a video display a graphical user interface (GUI) including plural content information panels each selectable to present on the display respective audio video content. The method further includes scrolling information panels using a first command pertaining to a first dimension such that information panels scroll onscreen and offscreeen responsive to the first command. According to the method, metadata pertaining to an audio video content represented by a first one of the content information panels is displayed responsive to a second command pertaining to a second dimension orthogonal to the first dimension.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIG. 2 is a top plan view of an example remote control (RC) that may be used to control the graphical user interfaces (GUI) described herein, schematically showing the processor and wireless transceiver;

DETAILED DESCRIPTION OF THE PREFERRED EMBODIMENT

Figures 3, 4:
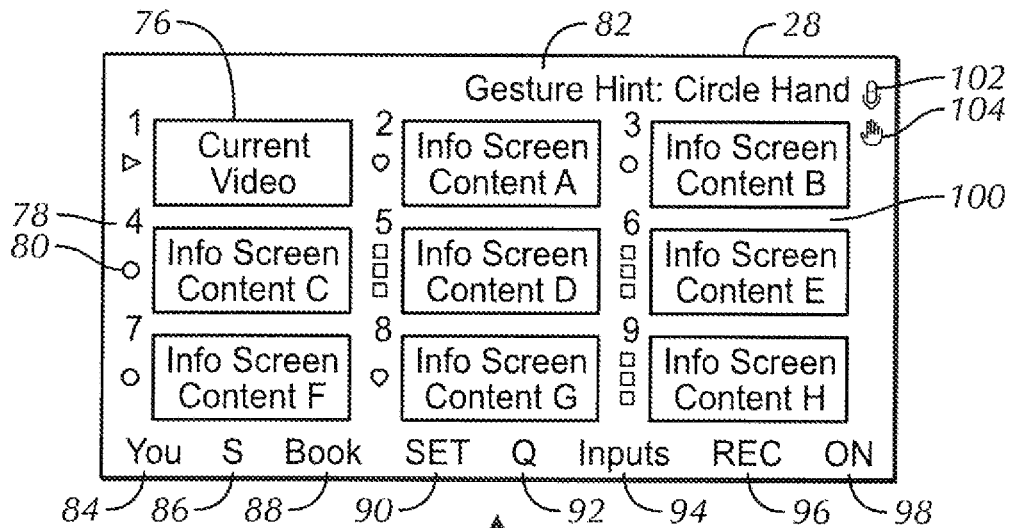
FIG. 3 is a screen shot of a nine panel GUI in a coarse mode suitable for gesture control.
FIG. 4 is a screen shot of a nine panel GUI in a fine mode suitable for RC control.

Referring initially to the non-limiting example embodiment shown in FIG. 1, a system 10 includes an audio video display device (AVDD) 12 such as a TV including a TV tuner 16 communicating with a TV processor 18 accessing a tangible computer readable storage medium 20 such as disk-based or solid state storage. The AVDD 12 can output audio on one or more speakers 22. The AVDD 12 can receive streaming video from the Internet using a built-in wired or wireless modem 24 communicating with the processor 18 which may execute a software-implemented browser 26. Video is presented under control of the TV processor 18 on a TV display 28 such as but not limited to a high definition TV (HDTV) flat panel display, and may be a touch screen display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the AVDD 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV. Other types of connections may be used, e.g., MOCA, USB, 1394 protocols, DLNA.

Similarly, HDMI baseband signals transmitted from a satellite source 42 of TV broadcast signals received by an integrated receiver/decoder (IRD) 44 associated with a home satellite dish may be input to the AVDD 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the AVDD 12 and conveyed to the AVDD 12 over a wired or wireless Ethernet link and received at an RJ45 or 802.11x antenna on the TV chassis.

Also, in some embodiments a video camera 50, which may be integrated in the chassis if desired or mounted separately and electrically connected thereto, may be connected to the processor 18 to provide to the processor 18 video images of viewers looking at the display 28. In some non-limiting embodiments, the processor 18 executes facial recognition using the video images received from the camera 50 to identify particular viewers. The processor 18 also stores images of viewers on the medium 20 in non-limiting embodiments for future determination of whether a viewer is recognized when compared to stored images, or whether a recently received image relates to a new, or non-recognized, viewer. If desired, the processor 18 also creates and/or associates a profile with a user and/or stored images of the user and store the profile on the medium 20. A microphone 52 may also be provided on the chassis or separate therefrom and can be electrically connected to the processor 18 to provide viewer-generated voice commands to the processor 18.

FIG. 2 shows that an example RC 30 may include a power on key 60 that can be toggled to energize and deenergize the AVDD 12. A touch-sensitive pad 62 may be provided against which a user can move his finger to correspondingly move a screen cursor on the display 28. Tapping the pad 62 can generate a "select" signal, it being understood that point-and-click devices other than the touch sensitive pad 62 may be used.

Also, a back key 64 may be provided to cause the display 28 to go back a screen shot, i.e., to present the screen shot immediately prior to the one being displayed when the back signal is generated, so as to enable a user to navigate through the various GUIs shown herein. A home key 66 may be provided to cause the below-described "home" GUI to be presented on the display 28, and an options key 68 may be provided to allow a user to cause a list of GUI options to be presented in the display 28. Volume output by the speakers 22 of the AVDD 12 can be controlled using a volume up/down rocker key 70. Manipulation of a key or the pad 62 on the RC 30 causes a respective signal to be sent to an RC processor 72 in the RC 30, which transmits the corresponding command to the AVDD 12 using a wireless transceiver 74 such as but not limited to an infrared transceiver. In addition, if desired four arrow keys may be arranged on the RC 30 to move a cursor up, down, left, and right on the display 28. Also, channel up/down keys may be provided as well as a microphone for voice input. A full QWERTY keyboard or keypad may be provided if desired. The touch pad 62 may be provided with a buzzer or other device to generate tactile feedback to the user.

FIGS. 3 and 4 show an example home GUI that may be presented on the display 28 of the AVDD 12. In the embodiment shown in FIG. 3, nine information panels arranged as shown in three rows of three panels each present visual content. The panels shown in FIG. 3 are of equal size with each other and are rectangular as shown. According to the embodiment shown in FIG. 3, the top left panel 76 of the GUI always shows the currently selected video content, typically either televised content from a selected TV channel or streaming video from a selected website. Information pertaining to available video content is presented in the other eight panels. This information typically includes a photograph or other image, a content source logo indicating the source of the content represented by the panel, and text typically describing the title of the content and other information.

As shown at 78, a numeral may be provided next to each panel, so that the panels may be numbered onscreen from one to nine as shown. This facilitates a user selecting to play video content from a panel by saying the numeral associated with the panel. Also, as shown at 80 a genre indicator may be presented next to each panel. The genre indicator may be an arrow in the case of the first panel 76 indicating that the first panel 76 is presenting the currently selected video. The genre indicator may be a heart (as shown in FIG. 3 for panel 2) indicating the underlying video content has been selected by the user as a "favorite". Other genre indicators may be presented respectively representing "history", meaning that the content associated with the panel had been presented previously, "recommended", meaning that the content associated with the panel is recommended by a recommendation engine executed by the AVDD processor 18, and so on, e.g., "frequently viewed", "promotional content". A user can select to present panels associated with content of only a single genre.

Additionally, if desired the GUI shown in FIG. 3 may present gesture hints 82, describing in text and/or animated hand motion a gesture and its associated command that the user may make, which can be captured by the camera 50 and correlated to the respective command by the processor 18 executing image recognition software. Thus, while viewer input may be afforded by making the display 28 a touch-sensitive display that a viewer can touch and thereby enter commands, present principles envision using viewer gestures in free space, i.e., gestures in which the viewer is distanced from the display 28 as would typically be the case for a TV viewer, with the viewer not touching the display but making gestures that are captured by the camera 50 and correlated to commands by the processor 18 executing image recognition software.

Further, a menu of selections may be presented as shown along the bottom of the GUI, including a "just for you" selector 84 to cause the GUI to contain panels with content personalized to a recognized user. A search selector 86 can be selected to cause a search for a user-input term to be executed. Also, a bookmark selector 88 can be selected to bookmark the currently playing video in panel 76 or to bookmark content in a panel over which the screen cursor is positioned.

Still referring to FIG. 3, a settings selector element 90 if selected causes a setting menus to be presented to control settings of the GUI. A queue selector element 92 may be presented to cause a list of enqueued programs to be presented on the display 28, and an inputs selector element 94 may be presented, selection of which causes a list of available input sources, e.g., "disk player, cable, satellite" to be presented on the display 28. A recommendations selector element 96 may be presented and if selected causes a list of recommended programming to be presented on the display 28. The list may be generated by a content recommendation engine such as the "Navi" engine made by Sony Corp. A "what's on" selector element 98 may be provided and if selected causes a list of current and future programs such as an electronic program guide (EPG) to be presented on the display 28. Indeed, an EPG may be presented in one of the panels shown in FIG. 3.

In any case, as mentioned above in the example shown the currently selected video content is always presented in the upper left panel 76 of the GUI. Should the user select another panel by using the RC 30 or by speaking the number of the panel or by the appropriate gesture captured by the camera 50, video content from the source associated with the selected panel automatically replaces the video content which was presented in the upper left panel 76 prior to receiving the new select signal. Indeed, should the user scroll the panels left or right to view additional content the upper left panel 76 remains unmoving as the other panels move on and off the display 28 as they are replaced by previously hidden content panels, with the upper left panel 76 always showing the currently selected video program.

The panel layout shown in FIG. 3 is somewhat coarse in that a visible border space 100 of many pixels width exists between adjacent panels as shown. Such a coarse representation facilitates control using gestures, although navigation by voice and by use of the RC 30 is always preferably enabled regardless of whether the GUI is in the coarse or fine view. FIG. 4 shows that if the user selects the fine view, the border space 100 disappears between adjacent panels, a view more suitable for RC control than gesture control although as stated above all three modes of command input (RC, voice, and gesture) remain enabled simultaneously with each other if desired.

Transition between the two views of FIGS. 3 and 4 may be effected by an appropriate hand gesture (e.g., a vertical motion of the hand) or by an appropriate voice command (e.g., "fine" or "coarse"), or by selecting, using the RC 30, "fine" or "course" from a settings menu accessed by selecting the settings selector element 90 or by pressing a key on the RC 30 or by simply grasping the RC, which is detected by the camera 50 and inferred by the processor 18 to correlate to a command to move to the "fine" screen of FIG. 4. The larger panels in the fine mode of FIG. 4 can be used to present more information than is presented in the panels of FIG. 3.

The GUI shown in FIGS. 3 and 4 may be removed from the screen and the currently playing video presented on the full display 28 by, e.g., toggling the home key on the RC 30. Voice command input may be enabled by voicing a phrase such as "hello TV", which is detected by the microphone 52 and using voice recognition software correlated by the processor 18 to a command to enable voice commands. Voice input may also be enabled using the RC 30 to select the "search" selector element 86. To indicate that voice commands are enabled, an icon such as an image of a microphone 102 can be presented on the display 28. Gesture command input may be enabled by waving the hand, which is detected by the camera 50 and using image recognition software correlated by the processor 18 to a command to enable gesture commands. To indicate that gesture commands are enabled, an icon such as an image of a hand 104 can be presented on the display 28.

Non-limiting examples of corresponding RC, voice, and gesture commands that accomplish the same tasks are:

| RC COMMAND | VOICE COMMAND | GESTURE |
|---|---|---|
| Channel up | "Channel up" | upward motion of hand |
| Channel down | "Channel down" | downward motion of hand |
| Volume decrease | "Quieter" | thumb down |
| Volume increase | "louder" | thumb up |

Figure 5:
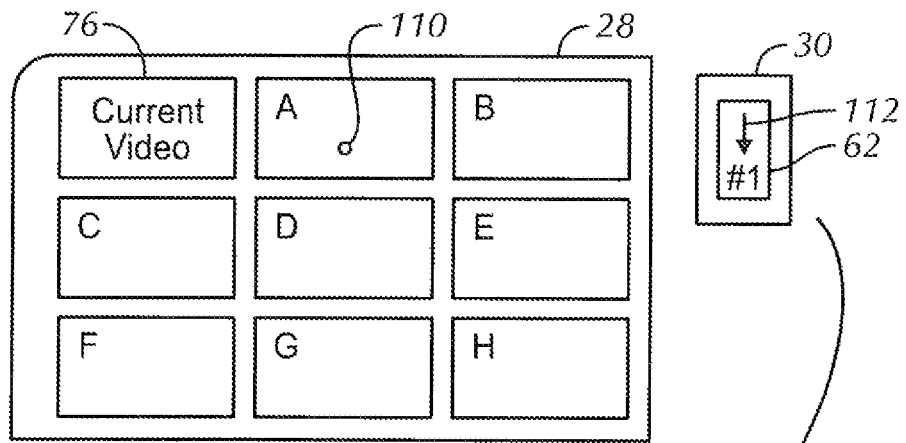
FIG. 5 is a screen shot of a simplified nine panel GUI along with a schematic representation of the RC to illustrate the beginning of a first vertical drag command to access metadata.
Figure 6:
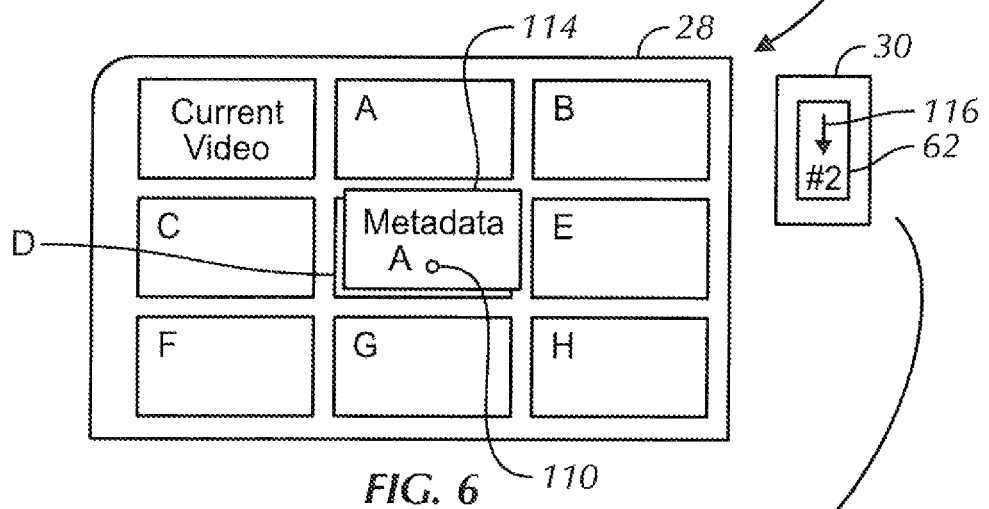
FIG. 6 is a screen shot similar to FIG. 5 showing the result of the first drag command and also showing a schematic representation of the RC to illustrate the beginning of a second vertical drag command to access additional metadata.
Figure 7:
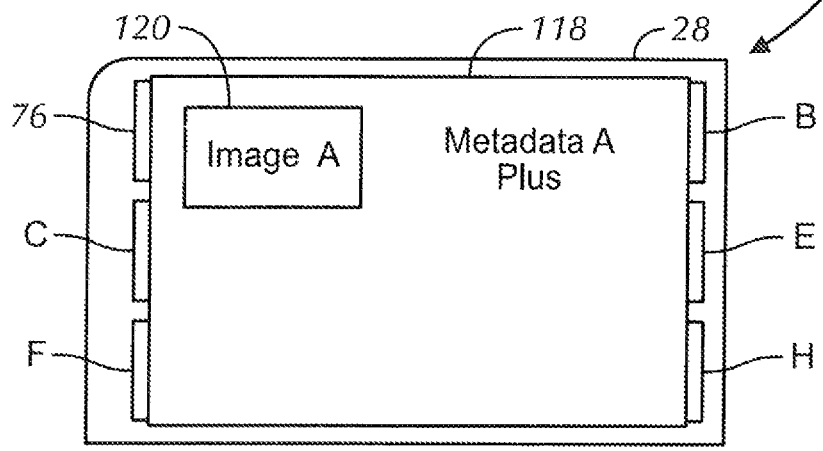
FIG. 7 is a screen shot showing the result of the second drag command.

FIGS. 5-7 illustrate how a viewer can use vertical drag commands on the above-described GUI to access metadata related to an audio video program represented by one of the content information panels described above. With a screen cursor 110 positioned over one of the information panels, in the example shown, the information panel related to program "A" (FIG. 5), a viewer can enter a vertical drag command to cause the screen shot of FIG. 6 to appear to show condensed metadata related to program "A"; a second vertical drag command causes the screen shot of FIG. 7 to appear to shown enhanced metadata pertaining to program "A". It may be recognized at this point that owing to the preferred GUI containing many columns of panels both onscreen and offscreen, but only three rows of panels all of which appear onscreen, vertical drag commands cannot be used to scroll through more panels in contrast to horizontal commands and so can be leveraged for other purposes which will not confuse the processor 18, such as, in this case, gaining access to metadata on a program quickly and intuitively. Naturally, this recognition applies in reverse, i.e., for embodiments which contain only three columns and many rows of panels, scrolling of panels may be effected by vertical commands while invoking metadata may be effected using horizontal commands.

With more specificity regarding the example embodiment shown and beginning with FIG. 5, a viewer may enter a vertical drag command using the touch pad 62 of the RC 30 by moving a finger downward on the touch pad from top to bottom on the touch pad as indicated by the arrow 112. In such a case, the command is "vertical" in that the finger motion is from top to bottom on the touch pad, emulating a vertical motion on the display 28. Alternatively, to enter the vertical drag command a viewer may move his hand vertically in free space, distanced from the RC 30 and display 28, from higher to lower, with the image of the moving hand being captured by the camera 50 and input to the processor 18, which interprets the vertical hand movement as a vertical drag command. In such a case, the command is "vertical" in that the hand motion is in the vertical dimension defined by the display 28. Yet again, the vertical drag command may be a verbal command such as "drag down" or "show metadata" which is captured by the microphone 52 and input to the processor 18.

In any case, responsive to receiving the vertical drag command from FIG. 5, the processor presents on the display 28 the screen shot of FIG. 6, in which a relatively small metadata window 114 is superimposed over the information panel (in the example shown, the information panel relating to program "D") that is below the information panel (in this case, the information panel related to program "A") to which the vertical drag command pertains (in this case, by virtue of the screen cursor 110 being initially over the information panel "A" when the vertical drag command is input). In one example embodiment, the metadata window 114 is substantially the same size and shape as one the information panels and may completely block the underlying information panel or may be slightly offset therefrom as shown. Or, the window 114 may encompass a larger or smaller area.

Content in the metadata window 114 may include the program title, rating, and time slot. It may also contain a short synopsis. Should the viewer desire still further details, the cursor 110 may be moved to the window 114 as shown in FIG. 6 and a second vertical drag command as indicated by the arrow 116 may be input to the processor 18 to cause the processor 18 to transition from the example screen shot of FIG. 6 to the example screen shot of FIG. 7, in which a relatively large metadata pane 118 is presented on the display 28. The relatively large metadata pane 118 contains additional metadata related to the program ("A" in the example shown) than contained in metadata window 114 of FIG. 6. For example, the metadata pane 118 may include additional plot details, actor biographies, etc. related to the program. The metadata pane 118 may also include a metadata image window 120 containing a still or motion picture representing the program "A", e.g., the metadata image window 120 may contain an image from the program or a clip taken from the program and may be different from the image presented in the information panel "A" shown in FIGS. 3 and 4 and related to the same program.

In the example shown, the pane 118 in FIG. 7 is relatively larger than the window 114 shown in FIG. 6 and can replace the window 114. The pane 118 may be superimposed on the underlying information panels and may substantially overlap all but the edges of the panels in the first and third columns as shown.

Note that the processor 18 may interpret a second vertical drag command as such to invoke the screen shot of FIG. 7 by virtue of the second command being received while the cursor 110 is on the relatively small metadata view. Or, the processor 18 may interpret a second vertical drag command as such to invoke the screen shot of FIG. 7 by virtue of the second command being received within a predetermined time period of receiving the first vertical drag command with the cursor 110 anywhere on the display 28 or even not in view on the display 28.

While the particular VERTICAL CLICK AND DRAG TO DRILL DOWN INTO METADATA ON USER INTERFACE FOR AUDIO VIDEO DISPLAY DEVICE SUCH AS TV is herein shown and described in detail, it is to be understood that the subject matter which is encompassed by the present invention is limited only by the claims.

What is claimed is:
1. Audio video display device (AVDD) comprising:
processor;
video display; and
computer readable storage medium bearing instructions executable by the processor to:

present on the display a grid of information panels, each information panel presenting visual information pertaining to respective audio video programs;
receive a vertical drag command;
determine the information panel to which the vertical drag command pertains; and
responsive to the vertical drag command and determination of which information panel the drag command pertains, present on the display metadata related to the information panel to which the vertical drag command pertains;
wherein the vertical drag command is a first vertical drag command and the metadata is a relatively small metadata view, and the processor, responsive to a second vertical drag command being received on the relatively small metadata view, presents on the display a relatively large metadata view containing metadata related to the information panel to which the first vertical drag command pertains;
receive a horizontal drag command;
responsive to the horizontal drag command, scrolling through a plurality of the information panels horizontally; and
wherein the vertical drag commands cannot be used to scroll through the information panels in contrast to the horizontal drag commands.

2. The AVDD of claim 1, wherein the relatively small metadata view is presented in a window superimposed on an information panel in a grid position below the information panel to which the vertical drag command pertains.

3. The AVDD of claim 1, wherein the vertical drag command is received from a touch pad of a remote control communicating wirelessly with the processor.

4. The AVDD of claim 1, wherein the vertical drag command is received from a camera imaging a human gesture in free space and communicating with the processor.

5. The AVDD of claim 1, wherein the vertical drag command is received from a microphone detecting a verbal drag command and communicating with the processor.

6. Audio video display device (AVDD) comprising:
processor;
video display; and
computer readable storage medium bearing instructions executable by the processor to:
present a graphical user interface (GUI) on the display, the GUI including plural content information panels each selectable to cause the processor to present on the display respective audio video content;
receive a first command pertaining to the GUI to access metadata related to an audio video program represented by a first one of the content information panels;
responsive to the first command, cause a screen shot to appear on the display to show condensed metadata related to a respective first audio video program represented by the first content information panel, the condensed metadata being presented in a window that is substantially the same size and shape as an information panel and being overlaid thereon;
receive a second command pertaining to the screen shot to access additional metadata;
responsive to the second command, cause a screen shot to appear on the display to show enhanced metadata related to the first audio video program, the enhanced metadata being presented in a second window larger than the first window;
wherein the first and second commands are first and second vertical drag commands;

receive a third command to scroll through a plurality of the information panels horizontally, the third command being a horizontal drag command;

wherein the GUI contains plural columns of information panels both onscreen and offscreen, but all of a plurality of rows of information panels always onscreen, such that vertical drag commands cannot be used to scroll through the information panels in contrast to the horizontal drag commands and so can be leveraged for other purposes which will not confuse the processor in gaining access to metadata on a program quickly and intuitively.

7. The AVDD of claim 6, wherein the second window substantially overlaps all but the edges of the information panels in first and third columns of the GUI.

8. The AVDD of claim 6, wherein the first window is superimposed on an information panel in a grid position below an information panel to which the first command pertains.

9. The AVDD of claim 6, wherein the second command is received by means of being input to the first window.

10. The AVDD of claim 6, wherein the second command is received and interpreted as a second command for presenting the enhanced metadata only if the second command is received within a predetermined time period of receiving the first command.

11. The AVDD of claim 6, wherein the first command is received from a touch pad of a remote control communicating wirelessly with the processor.

12. The AVDD of claim 6, wherein the first command is received from a camera imaging a human gesture in free space and communicating with the processor.

13. The AVDD of claim 6, wherein the first command is received from a microphone detecting a verbal drag command and communicating with the processor.

14. The AVDD of claim 6, wherein the computer readable storage medium bears further instructions executable by the processor to:

present a currently selected content panel on the GUI presenting content selected by a user; and responsive to the horizontal drag command to scroll through information panels, present additional content information panels on at least part of the GUI while continuing to present the currently selected content panel.

* * * * *